United States Patent [19]

Ghougasian

[11] Patent Number: 4,962,641
[45] Date of Patent: Oct. 16, 1990

[54] PULSE JET ENGINE

[75] Inventor: John N. Ghougasian, Bronx, N.Y.

[73] Assignee: Elizabeth Ghougasian, Bronx, N.Y.

[21] Appl. No.: 316,854

[22] Filed: Feb. 28, 1989

[51] Int. Cl.⁵ .............................................. F07K 7/067
[52] U.S. Cl. ........................................ 60/249; 60/247; 60/39.77
[58] Field of Search .............. 60/249, 247, 248, 39.77, 60/39.76, 39.78, 39.79, 39.8

[56] References Cited

U.S. PATENT DOCUMENTS

| | | |
|---|---|---|
| 1,983,405 | 12/1934 | Schmidt . |
| 2,399,394 | 4/1946 | Seippel . |
| 2,543,758 | 3/1951 | Bodine, Jr. .................... 60/247 |
| 2,547,095 | 4/1951 | Robins . |
| 2,580,908 | 1/1952 | Goddard ..................... 60/39.77 |
| 2,675,670 | 4/1954 | Tenney . |
| 2,677,232 | 5/1954 | Collins . |
| 2,743,575 | 5/1956 | Brzozowski ................. 60/249 |
| 2,812,635 | 11/1957 | Foll et al. ...................... 60/249 |
| 2,814,930 | 12/1957 | Meulien et al. ............. 60/249 |
| 2,823,554 | 2/1958 | Enyeart . |
| 2,888,803 | 6/1959 | Pon . |
| 2,912,821 | 11/1959 | Horak . |
| 2,919,542 | 1/1960 | Servanty et al. . |
| 3,005,310 | 10/1961 | Reder . |
| 3,117,750 | 1/1964 | Snell . |
| 3,188,804 | 6/1965 | Melenric . |
| 3,208,214 | 9/1965 | Servanty et al. . |
| 3,354,650 | 11/1967 | Malroux ....................... 60/249 |
| 3,517,510 | 6/1970 | Melenric ...................... 60/249 |
| 3,632,047 | 1/1972 | Ghougasian . |
| 3,823,554 | 7/1974 | Melenric ...................... 60/249 |
| 3,975,913 | 8/1976 | Erickson . |

Primary Examiner—Donald E. Stout
Attorney, Agent, or Firm—Fleit, Jacobson, Cohn, Price, Holman & Stern

[57] ABSTRACT

Combustion supporting air in the resonator tube of a pulse jet engine is cyclically compressed by combustion and discharged through a decelerating passage of a diffuser in a tail section of the engine to internally pressurize an afterbody preceding atmospheric dishcarge of the combustion products through nozzle passages, followed by primary refill with air from the pressurized afterbody and secondary refill by reentry of external air. The nozzle passages are formed in angularly spaced, rearwardly diverging vane formations of the tail section projecting from a protective casing directing ram air intake into orifice openings formed in a rear end portion of the diffuser to regulate afterbody pressurization under control of ram pressure created by forward propulsion of the engine.

18 Claims, 2 Drawing Sheets

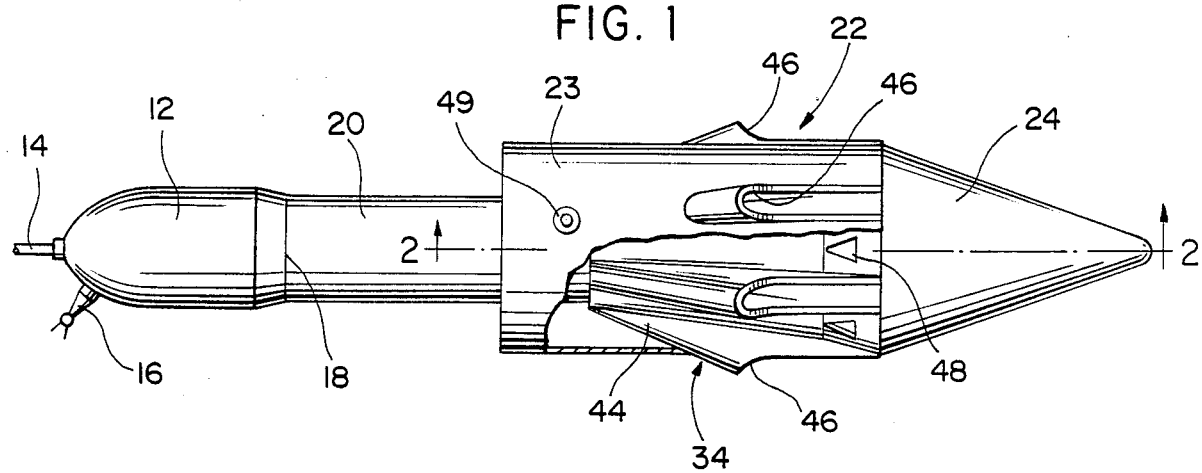
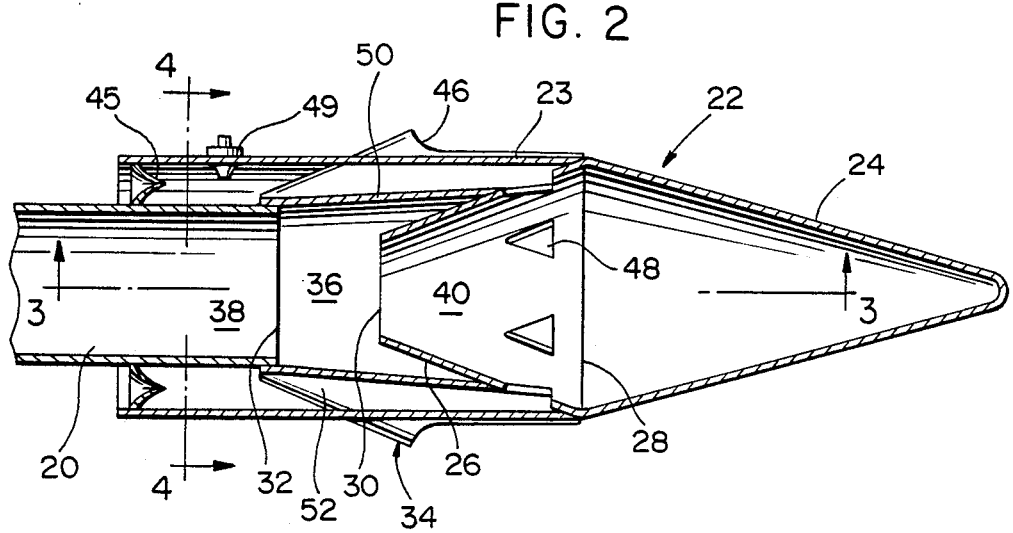
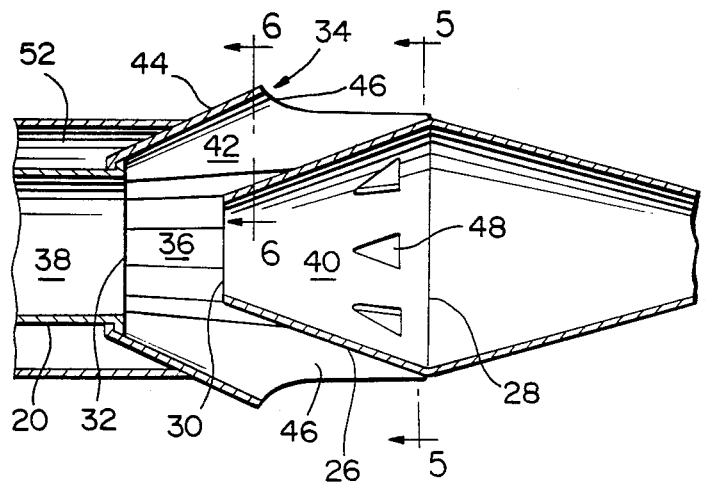

PULSE JET ENGINE

BACKGROUND OF THE INVENTION

This invention relates in general to pulse-jet engines and more particularly to an improved tail section associated therewith.

Various reaction thrust engines for propelling missiles, aircraft and other vehicles through the atmosphere are well known. Many improvements have been heretofore proposed for such engines in an effort to improve operational efficiency under different conditions such as air speed, altitude and atmospheric pressure. Generally, such improvements involve relatively complex controls and valve arrangements which significantly increase production, maintenance and repair costs, and also introduce other operational problems.

It is also generally acknowledged in the art that ram-jet types of reaction thrust engines as heretofore known are superior to other reaction thrust propulsion engines below a limiting altitude.

It is therefore an important object of the present invention to provide an improved reaction thrust engine that is less costly and yet provides for operational efficiency under widely varying operational conditions, such as air speed and altitude.

It is a further object in accordance with the foregoing object to provide a reaction thrust engine having the advantages of a ram-jet engine at lower altitudes and yet providing operational capabilities at higher altitudes substantially surpassing that of a ram-jet engine.

SUMMARY OF THE INVENTION

In accordance with one embodiment of the present invention, a tail section of a pulse-jet type of reaction thrust engine interconnects its resonator tube and afterbody to control cyclic compression of combustion supporting air and atmospheric discharge of combustion products, regulated by ram-air pressure generated as a result of forward propulsion of the engine under its reaction thrust.

Outflow of compressed air from the resonator tube of the engine under pressure of combustion products from the combustion chamber is decelerated through a divergent passage of a diffuser in the tail section and received within an afterbody storage chamber, which is thereby pressurized during an initial compression phase of each operational cycle preceding discharge of the combustion products from the resonator tube to atmosphere through nozzle ports of the tail section during a following reaction thrust phase of the cycle. The nozzle ports are formed by the rearwardly opening ends of nozzle passages extending through angularly spaced formations projecting from the tail section and extending in axially overlapping relation between the resonator tube and the aforementioned diffuser. The nozzle formations act as vanes to guide rearward airflow therebetween within the tail section in alignment with orifice openings formed on a rear end portion of the diffuser. Such orifice openings accordingly receive a guided inflow of air under ram pressure to automatically regulate the pressure level in the afterbody pressurized during the compression phase of each cycle in accordance with the airspeed and altitude of the vehicle or craft carrying the engine.

The foregoing pressure level regulation affects refill of the resonator tube with combustion supporting air when negative vacuum pressure is developed therein at the end of the reactive thrust phase of each pulse-jet cycle. During the refill phase of each cycle, the resonator tube is initially recharged by an inflow of air from the pressurized afterbody, accelerated through the diffuser, at a variable ratio to external reentering air conducted through the nozzle passages. Such refill of the resonator tube thus occurs under control of the static pressure differentials between the negative pressure in the resonator tube passage, the ram-air increased pressure level in the afterbody and the atmospheric pressure so as to regulate the variable refill ratio as a function of altitude and air speed. Efficient engine operation may thereby be achieved with diminished reentry of external air at high altitudes under high air speeds.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 1 is a simplified side elevation view of a pulse-jet engine constructed in accordance with one embodiment of the present invention, with part of the tail section broken away.

FIG. 2 is an enlarged partial section view taken substantially through a plane indicated by section line 2—2 in FIG. 1, showing the tail section of the engine in detail.

FIG. 3 is a side section view taken substantially through a plane indicated by section line 3—3 in FIG. 2.

Figure 4:
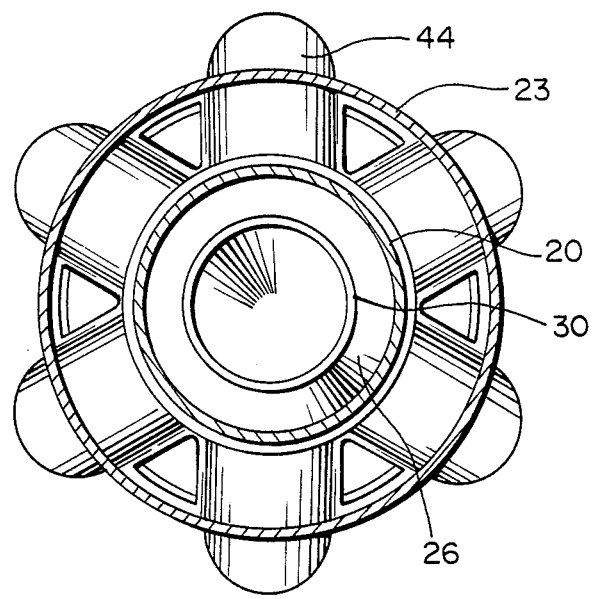
Figure 5:
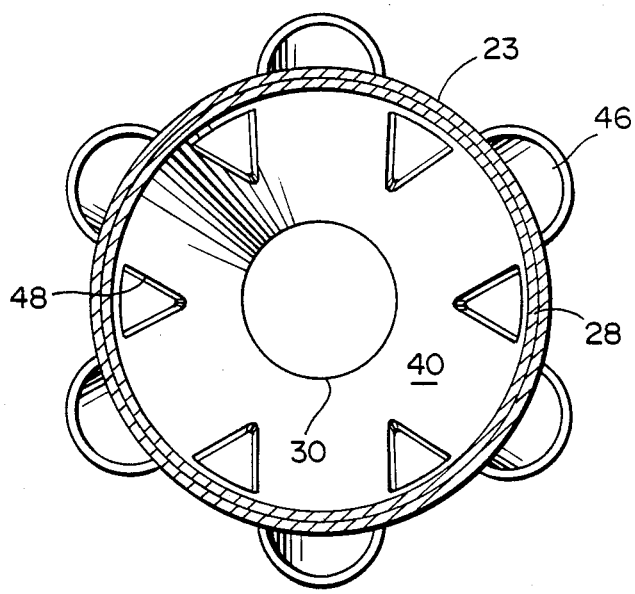

FIGS. 4 and 5 are transverse section views substantially taken through planes indicated by section lines 413 4 and 513 5 in FIGS. 2 and 3, respectively.

Figure 6:
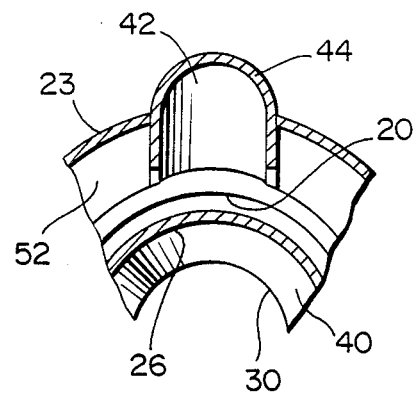

FIG. 6 is an enlarged partial section view taken substantially through a plane indicated by section line 6-6 in FIG. 3.

DETAILED DESCRIPTION OF PREFERRED EMBODIMENT

Pulse-jet engine 10 as shown in FIG. 1 includes a combustion chamber section 12 at its forward end to which a continuous supply of fuel is fed through a fuel inlet 14. The combustion chamber section 12 mounts an ignition device 16 and is connected to the forward end 18 of a resonator tube 20. The resonator tube 20 extends into a tail section of the engine, generally referred to by reference numeral 22, from which a rearwardly converging afterbody 24 projects.

The engine tail section 22, as shown in detail in FIGS. 2-6, includes a generally cylindrical, annular conduit casing 23 enclosing a rearwardly divergent conical diffuser 26 connected at its large diameter end 28 to the casing and the afterbody 24. The opposite small diameter end 30 of the diffuser is axially spaced from the rear end 32 of the resonator tube 20 to which the diffuser is fixedly connected by a rearwardly diverging nozzle assembly 34 within the cylindrical casing 23. The nozzle assembly 34 encloses an internal flow space 36 between the axially spaced ends 32 and 30 of the resonator tube 20 and diffuser 26, as shown in FIGS. 2 and 3, to establish fluid communication between air column passage 38 within the resonator tube 20 and the afterbody 24 through conical passage 40 in the diffuser.

The internal flow space 36 is also in fluid communication with nozzle passages 42 respectively extending through a plurality of angularly spaced nozzle vane formations 44 of the nozzle assembly projecting from the casing 23. In the illustrated embodiment, as more clearly seen in FIG. 4, six nozzle formations 44 are provided in equally spaced, angular relation to each other rearwardly exposing a surface portion of the diffuser 26 within casing 23 adjacent the rear end. The nozzle passages 42 are terminated at atmospheric ports 46 of the nozzle vane formations 44 externally of the casing 23 in non-interfering relation to orifice openings 48 formed in a rear end surface portion of diffuser 26. The formations 44 act to guide rearward airflow entering the casing 23 at its forward open end through one-way check valves 45 along guided intake flow passages 52 as shown in FIG. 2. Such guided airflow is directed against the rear end surface portion of the diffuser 26 at which the orifice openings 48 are located. An air bleed check valve 49 may be mounted on the casing 23 adjacent the inlet check valves 45. Wall portions 50 of the nozzle assembly, as more clearly seen in FIG. 2, separate the internal flow space 36 from the rearwardly guiding airflow passages 52 within casing 23.

Operation of the pulse-jet engine 10 is initiated with the continuous supply of fuel to the combustion chamber section 12 and ignition of the fuel-air mixture therein by the spark plug device 16 to begin an operational cycle. Combustion of the fuel-air mixture for a cyclic duration dependent on the quantity of combustion supporting air in the combustion chamber section 12 of the engine, produces a body of heated and rearwardly expanding combustion products exerting a rapidly increasing pressure force on a relatively static air column within the resonator tube 20. When such pressure force exceeds the mass of the engine and the air column, the engine is propelled forwardly by recoil reaction to augment compression of the air column within the resonator tube by the pressure force of the heated expanding combustion products.

The compressed air column within the passage 38 of the resonator tube 20 is rearwardly displaced ahead of the combustion products for decelerated outflow into the storage chamber of afterbody 24 through flow space 36 and divergent passage 40 of the diffuser 26, causing pressurization of the afterbody and momentary storage therein of compressed combustion supporting air. Such initial pressurization of the afterbody ensures that the following outflow of combustion products from the resonator tube is discharged to atmosphere through the nozzle passages 42 in the nozzle vane formations 44. Such atmospheric discharge of combustion products from the nozzle ports 46 of formations 44 increases the cyclic engine propelling thrust to its peak value and establishes a negative vacuum pressure within the passage 38 of the resonator tube as the propulsion thrust phase of the cycle is terminated.

In response to the aforesaid development of negative pressure in the resonator tube 20, a resonator refill phase of the cycle ensues during which the previously pressurized afterbody discharges its stored air into the resonator tube with acceleration through the convergent flow passage 40 within the diffuser 26 prior to secondary reentry inflow of atmospheric air through the nozzle ports 46 of the nozzle passages 42. The resonator tube 20 and combustion chamber 12 are thereby cyclically recharged with primary combustion supporting air from the afterbody and secondary atmospheric reentry air at a variable refill ratio.

During forward movement of the engine, external airflow relative thereto enters the open axial end of casing 23 through inlet valves 45 and is rearwardly directed between the nozzle vane formations 44 along wall portion 50, as aforementioned, against the rear end surface portion of diffuser 26 for inflow into the afterbody through the orifice openings 48 under ram pressure. Such ram air intake of external air imposes a pressure level regulating affect on the cyclic pressurization of the afterbody 24, as a function of air speed and atmospheric altitude pressure. For example, at higher air speeds generating higher ram-air pressure, a higher pressure level is maintained within the afterbody 24 throughout so as to correspondingly increase compression of the air column within the resonator tube and cycle frequency with diminished recovery of secondary reentry air through ports 46. Such a ram air recovery mode of operation is of particular advantage in regulating air pressure level within the afterbody to correspondingly regulate the variable refill ratio aforementioned. At standstill or low speed and low altitude, higher atmospheric air pressure is bled into the engine through bleed valve 49 as another source of pressurized air located in rearward adjacency to the inlet check valves 45 on the casing 23 for good start-up operation. Thus, engine operation is regulated for optimum efficiency under different conditions of air speed and altitude including high altitudes tolerating the diminished inflow of secondary reentry air under high air speeds because of the associated ram-air increased storage chamber pressure level. It is furthermore contemplated that the engine operational regulation afforded by the tail section 22 as hereinbefore described, may be coordinated with various controls, valves, and other arrangements associated with the combustion chamber and afterbody storage chamber to provide related and additional benefits and advantages.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a reaction thrust propulsion engine having a forward end combustion chamber section, a rear end afterbody and a resonator tube extending rearwardly from the combustion chamber section to the afterbody, a tail section operatively interconnecting the resonator tube and the afterbody, comprising passage means establishing fluid communication between the resonator tube and the afterbody for cyclically pressurizing the afterbody with combustion supporting air compressed within the resonator tube in response to generation of combustion products within the combustion chamber section, nozzle means for sequentially discharging the combustion products from the resonator tube and conducting an inflow of external reentry air to the resonator tube and ram-air intake means responsive to forward movement of the engine for regulating said pressurization of the afterbody and refill of the resonator tube by inflow of the compressed air from the pressurized afterbody and the reentry air.

2. The combination of claim 1 wherein said passage means includes a flow diffusing section having opposite ends respectively spaced from the resonator tube and connected to the afterbody and wall means interconnecting the resonator tube and the flow diffusing section for separating said fluid communication between the resonator tube and the flow diffusing section from the ram-air intake means within the tail section.

3. The combination of claim 2 wherein said ram-air intake means includes an external casing from which the nozzle means projects and a rear end portion of the flow diffusing section enclosed within the casing having inflow orifice openings.

4. The combination of claim 3 wherein said nozzle means includes a plurality of rearwardly diverging nozzle formations interconnected by the wall means and projecting radially outward from the casing, each of said nozzle formations having a rearwardly opening port and a nozzle passage extending between the port and the passage means.

5. The combination of claim 2 wherein said nozzle means includes a plurality of rearwardly diverging nozzle formations interconnected by the wall means and projecting radially outward therefrom to act as ram air intake vanes guiding airflow along the wall means, each of said nozzle formations having a rearwardly opening port and a nozzle passage extending forwardly from the port to the passage means.

6. The combination of claim 5 wherein said ram-air intake means comprises a rear end portion of the flow diffusing section having inflow orifice openings in operative alignment with said guided airflow between the nozzle formations.

7. In a pulse-jet engine having a resonator tube from which an air column is rearwardly displaced under compression by heated and expanding combustion products in cyclic relation to refill thereof with combustion supporting air, a tail section connected to the resonator tube comprising a flow diffusing section, passage enclosing wall means interconnecting the resonator tube and the flow diffusing section for decelerated outflow of the rearwardly displaced air column from the resonator tube through the flow diffusing section, nozzle means mounted on the wall means for externally discharging the combustion products from the resonator tube following said decelerated outflow of the air column through the flow diffusing section and orifice means mounted on the flow diffusing section for regulating said refill of the resonator tube following said discharge of the combustion products.

8. The combination of claim 7 wherein said nozzle means comprises a plurality of angularly spaced vane formations through which nozzle passages extend, respectively, in fluid communication with the resonator tube, said vane formations having rearwardly opening ports terminating the nozzle passages in non-interfering relation to the orifice means.

9. The combination of claim 8 wherein said orifice means comprises a plurality of flow restricting openings angularly spaced between the vane formations in a surface portion of the flow diffusing section rearwardly of the nozzle means.

10. The combination of claim 7 wherein said orifice means comprises a plurality of flow restricting openings in a surface portion of the flow diffusing section rearwardly of the nozzle means.

11. The combination of claim 10 including ram-air intake means for guiding airflow along the wall means into the flow restricting openings.

12. The combination of claim 7 including ram-air intake means mounted on the nozzle means for guiding airflow along the wall means into the orifice means.

13. In a reaction thrust propulsion engine having a forward end combustion chamber section, a rear end afterbody and a resonator tube extending rearwardly from the combustion chamber section to the afterbody, a tail section operatively interconnecting the resonator tube and the afterbody, comprising passage means establishing fluid communication between the resonator tube and the afterbody for cyclically pressurizing the afterbody with combustion supporting air compressed within the resonator tube in response to generation of combustion products within the combustion chamber section, nozzle means for sequentially discharging the combustion products from the resonator tube and conducting an inflow of external reentry air to the resonator tube and intake means through which an inflow of pressurized air is conducted for regulating said pressurization of the afterbody and refill of the resonator tube by the compressed air from the pressurized afterbody and the reentry air.

14. The combination of claim 13 wherein said passage means includes a flow diffusing section having opposite ends respectively spaced from the resonator tube and connected to the afterbody and wall means interconnecting the resonator tube and the flow diffusing section for separating said fluid communication between the resonator tube and the flow diffusing section from the ram-air intake means within the tail section.

15. The combination of claim 13 wherein said flow diffusing section has inflow orifice openings and said intake means includes an external casing having a forward inlet end portion and a rear end portion connected to the afterbody in enclosing relation to the inflow orifice openings.

16. The combination of claim 15 including ram-air inlet valve means mounted within the inlet end portion of the casing for receiving said inflow of the pressurized air in response to forward movement of the engine.

17. The combination of claim 15 including a source of pressurized air mounted adjacent the inlet end portion of the casing for receiving said inflow of the pressurized air during start-up operation of the engine at standstill.

18. The combination of claim 17 wherein said source of pressurized air is a bleed valve through which atmospheric air is received within the casing at low altitudes.

* * * * *